March 15, 1960  R. J. TESTER  2,928,439
BAND SAW MACHINE MAKING CUTS AT VARIOUS ANGLES
AND ALL CUTS PASSING THROUGH A COMMON POINT
Filed July 21, 1958  4 Sheets-Sheet 1

INVENTOR.
RAYMOND J. TESTER
BY
Lieber, Lieber & Nilles
Attorneys

March 15, 1960 R. J. TESTER 2,928,439
BAND SAW MACHINE MAKING CUTS AT VARIOUS ANGLES
AND ALL CUTS PASSING THROUGH A COMMON POINT
Filed July 21, 1958 4 Sheets-Sheet 2
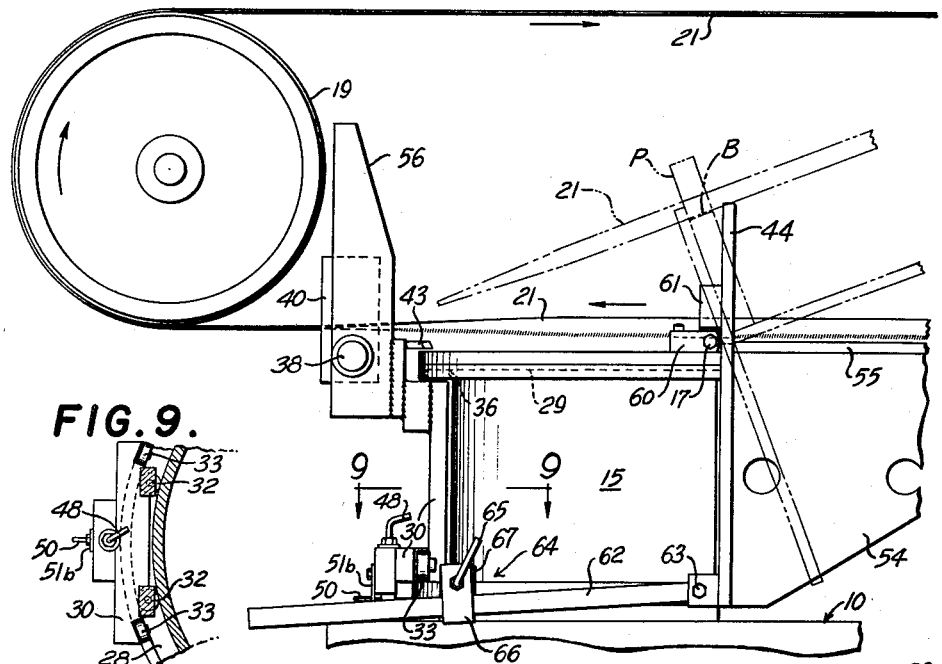
FIG. 3.
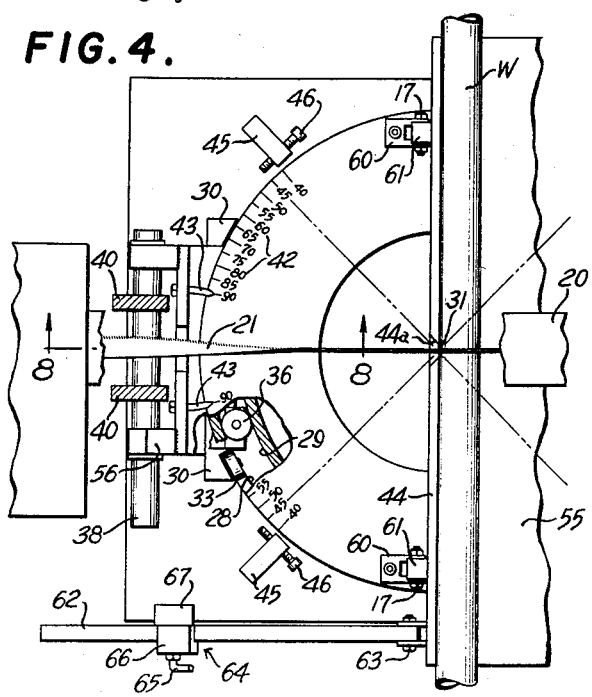
FIG. 9.
FIG. 4.
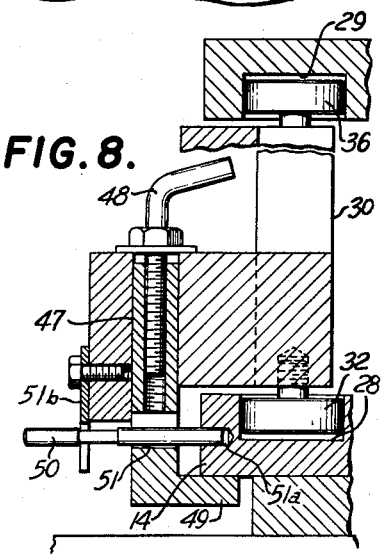
FIG. 8.
INVENTOR.
RAYMOND J. TESTER
BY
Lieber, Lieber & Nilles
Attorneys March 15, 1960 R. J. TESTER 2,928,439
BAND SAW MACHINE MAKING CUTS AT VARIOUS ANGLES
AND ALL CUTS PASSING THROUGH A COMMON POINT
Filed July 21, 1958 4 Sheets-Sheet 3

INVENTOR.
RAYMOND J. TESTER
BY
Lieber, Lieber & Miller
Attorneys

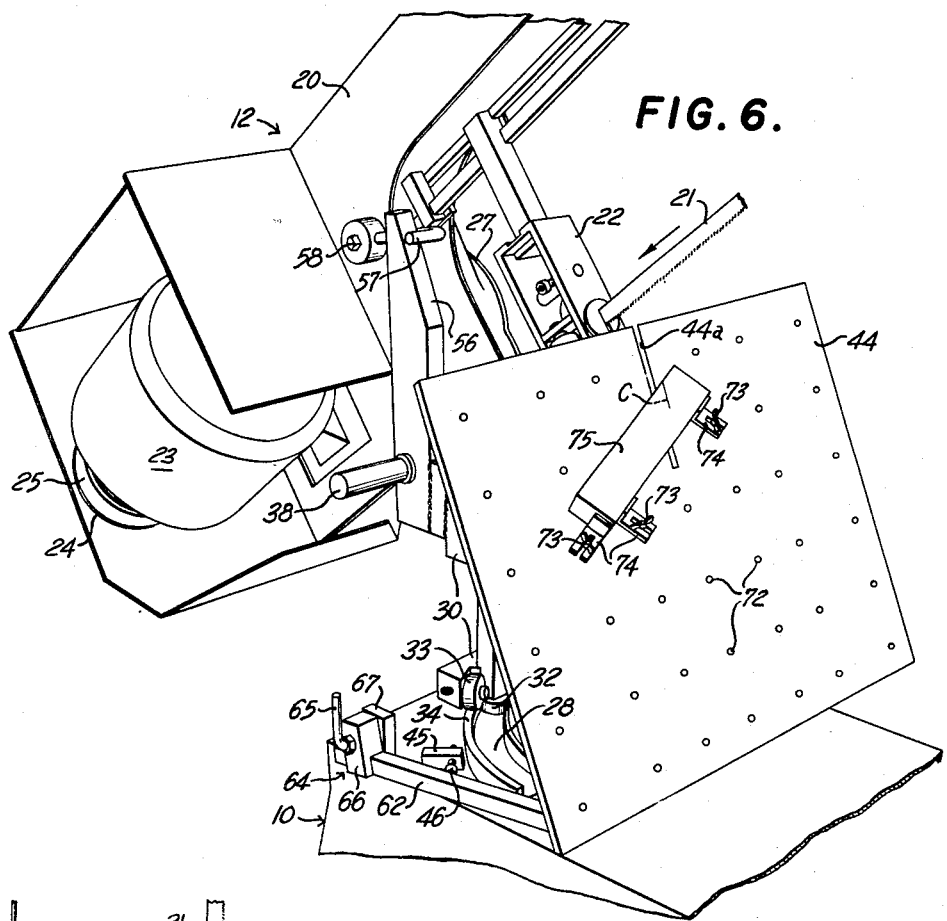
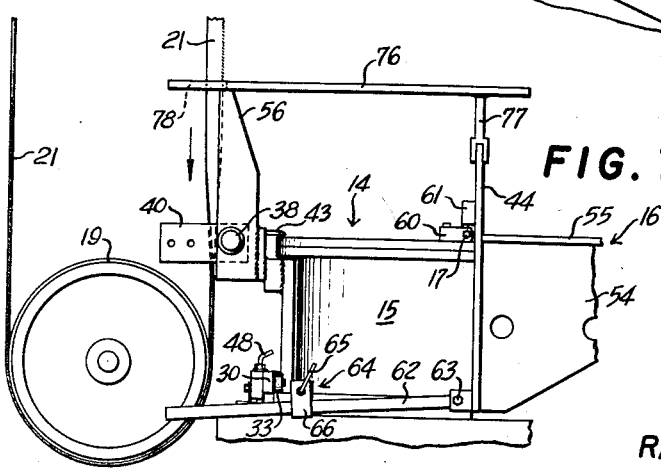

United States Patent Office

2,928,439
Patented Mar. 15, 1960

2,928,439

BAND SAW MACHINE MAKING CUTS AT VARIOUS ANGLES AND ALL CUTS PASSING THROUGH A COMMON POINT

Raymond J. Tester, Iron River, Wis.

Application July 21, 1958, Serial No. 749,911

11 Claims. (Cl. 143—24)

This invention relates generally to band saws and more particularly to that type of saw which is adapted to be swung to various cutting positions.

Prior art devices of this general character have been proposed in which the head that carries the driven endless saw blade can be jackknifed between horizontal cutting and vertical cutting positions. This head was additionally capable of being tilted about its longitudinal axis so as to cut at an angle to the vertical and could also be swung about a vertical pivot axis to change the horizontal angular cutting position of the blade relative to the workpiece.

Although these prior art devices provided flexibility of operation, they did have certain shortcomings. For example, a blade that was tilted about its longitudinal axis relative to the surface of the work was difficult to use to cut a piece of stock at an angle, because the blade would tend to creep along the surface of the piece before biting in. This was particularly true when attempting to cut stock of round cross-section, and inaccurate cutting resulted.

When it was desired to cut a length of stock on a horizontal table and at different cut-off angles, another shortcoming of jackknifing band saws of this type was the fact that the saw blade did not have a common reference point in respect to the stock, for any and all angular positions of the blade. As a result, several different set-up operations were required when it was desired to change the angle of cut.

Another difficulty in prior art saws when forming a cut that extends only partially through a workpiece is in forming the bottom of this cut "square" with the surface of the piece. For example, when cutting a slot or V-shaped notch in a piece, it is often necessary to have the bottom of the notch normal to the surface of the workpiece and this squaring-up usually requires secondary operations.

Accordingly, it is an object of the present invention to provide a highly versatile band saw which eliminates the above shortcomings of and difficulties experienced with prior art saws.

The present invention provides a band saw having a cutting head assembly mounted for swinging between vertical and horizontal cutting positions and which also is mounted for swinging about a vertical axis so as to be capable of cutting at various horizontal angular positions relative to the workpiece. The arrangement of the pivot axes is such that the saw blade has a common reference point, in relation to the stationary part of the machine, such as a work-supporting table, regardless of the angular position of the blade in respect to the table.

Another object of the invention is to provide a band saw of the above type and having a novel work-supporting table that can be tilted and the work clamped thereto in such a manner whereby the blade can form "square bottom" cuts, when such cuts extend partially through the workpiece. This aspect of the invention further contemplates that part of the supporting table may be removed and only the vertical rear wall thereof utilized to support workpieces or jigs therefor, which arrangement greatly enhances flexibility of operation and, additionally, the production rate is increased. Furthermore, when the saw is in the vertical cutting position, the regular table acts as a support for a quickly attachable auxiliary table.

Another and important object of the present invention is to provide a band saw having a cutting head, which head is mounted for swinging about a vertical axis and is also mounted about a horizontal axis. The arrangement is such that the line of pull of the cutting flight passes closely adjacent the horizontal pivot axis of the saw head. Thus the moment arm through which this line of force is effective is almost negligible and a smoothly operating and chatter-free saw is provided. This particularly smooth operation is obtained regardless of the cutting position of the saw and also regardless of the number or size of saw teeth.

These and other objects and advantages of the present invention will appear later as this disclosure progresses, reference being had to the accompanying drawings, in which:

Figure 3 is a fragmentary side elevational of the saw shown in Figure 1, but on an enlarged scale and with the saw blade normal to the rear fence, certain parts being removed, broken away or shown in section for clarity;

Figure 4 is a fragmentary plan view of the saw shown in Figure 3, certain parts being removed, broken away or in section for clarity in the drawings;

Figure 6 is a fragmentary perspective showing part of the table removed and the rear wall thereof in a tilted position with a workpiece clamped thereon;

Figure 7 is a fragmentary side view showing the saw head in the vertical position and with the auxiliary table in place;

Figure 8 (sheet 2) is a sectional view, on an enlarged scale, taken on line 8—8 in Figure 4; and Figure 9 is a sectional view, on an enlarged scale, taken on line 9—9 of Figure 3.

Figures 1, 2:
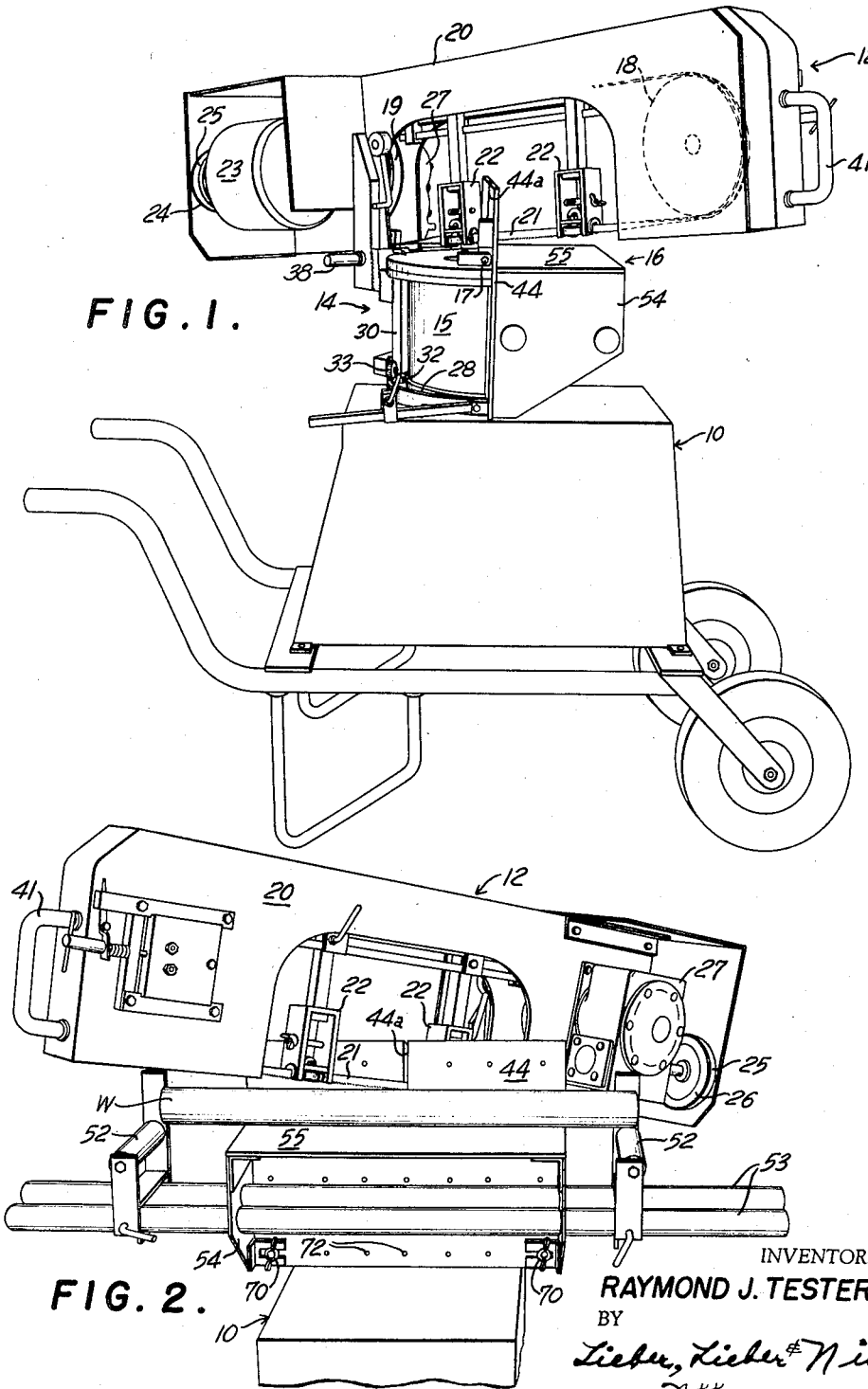
Figure 1 is a perspective view of a band saw made in accordance with the present invention, the view being taken generally from the right side of the saw, and the saw set to cut a workpiece at an angle.
Figure 2 is a fragmentary front perspective view of the saw shown in Figure 1, but with a workpiece on the table and the table extension attachment in place.

Referring in greater detail to the drawings, the machine has been shown in Figure 1 as being mounted on a portable base 10, and includes a saw head 12 which is adjustably mounted in a variety of positions relative to the support structure 14. The structure 14 includes an arcuate-shaped stationary portion 15 and a work supporting table assembly 16, the latter of which is adjustably mounted on the stationary portion 15 for swinging about the horizontal pivotal connections 17, by which it is attached to the portion 15.

The saw head 12 is conventional and as it is well-known and per se, forms no part of the present invention, a brief description thereof is thought to be sufficient. This head includes a front pulley 18 and rear pulley 19, both of which are rotatably mounted within the housing 20 and have an endless saw blade 21 trained therearound. A pair of conventional blade turning assemblies 22 function in the known manner to twist the working flight of the blade so that it cuts in a direction normal to the table, that is, in a vertical plane. An electric motor 23 having a driver pulley 24 is also mounted within housing 20 and, through a flexible belt 25 trained around the pulley 24 and a pulley 26 of a gear reduction unit 27, drives the rear pulley 19 of the saw blade.

The stationary structure 14 is rigidly secured to the base 10 in any suitable manner and includes a lower semi-circular guide track 28 which is of channel-shaped cross section, and also includes an opposed upper guide track 29. The upper track is also channel-shaped in cross section and has its open side facing downwardly and complementing the lower track. See Figure 8.

The head 12 together with a carriage 30 form a saw head assembly which provides both vertical swinging and horizontal swinging for the head as follows.

The carriage 30 is mounted in tracks 28 and 29 and carries the saw head 12 so as to provide a vertical pivot axis about point 31 (Figure 4) for the head relative to the table. Carriage 30 has a pair of spaced apart lower anti-friction rollers or wheels 32 rotatably mounted thereon on a vertical axis and which are adapted to ride in the lower track 28 so as to absorb side thrust as the head rotates about axis 31 and prevents lateral displacement of the carriage relative to the structure 14. The lower end of the carriage also has a pair of spaced rollers 33 (Figures 3 and 9) which are mounted on horizontal axes and are adapted to ride on the face 34 of the outer flange of track 28. These rollers 33 serve primarily to carry the weight of saw head.

The carriage 30 adjacent its upper end also has a pair of anti-friction rollers 36 mounted on vertical axes and arranged to ride in the upper track 29. The rollers 36 of this upper pair are spaced a distance apart from one another as are each of the rollers 32 and 33 of the lower pairs, so that good bearing support is provided for rotatably mounting the saw-carrying carriage on the stationary portion 15.

A horizontal pivot shaft 38 is rotatably carried by the carriage for pivotally supporting the saw head on a horizontal axis for swinging the latter between the horizontal cutting or "cut-off" position shown in Figure 1 to a vertical cutting position shown in Figure 7. In addition, the saw is capable of cutting in tilted positions between these two positions, such as the position shown by the broken lines in Figure 3. The saw head is swingably mounted on this shaft by the two spaced arms 40 which extend from the head and are secured at their free ends to shaft 38 for oscillation therewith. The operator grasps the handle 41 for swinging the saw to the desired position.

In any of these positions, it will be noted that the line of pull of the cutting flight as it passes through the workpiece is almost directly through the pivot axis 38, for reasons that will appear later.

For accurately positioning the saw in any one of a plurality of positions about its vertical axis 31, the upper surface of the stationary structure 14 is provided with graduated quadrants 42 (Figures 4 and 5) inscribed along its arcuate edge and with which the pointers 43 cooperate to measure the angular position of the head relative to the rear fence 44 of the table. The arrangement is such that the saw head can be swung about its vertical axis 31 through an arc of forty-five degrees from the full line position shown in Figure 4 where the blade extends in a normal direction relative to the fence 44. Adjustable stops 45, 46 (Fig. 4) are secured to the base 10 and the carriage abuts against one or the other when at the end of its travel in either direction.

Locking means are provided for securely holding the table in any one of these positions as follows, and as best shown in Figures 8 and 9. An L-shaped member 47 is slidably mounted within the lower rear portion of the carriage 30 and a crank 48 is threadably engaged in this member. Turning the crank in one direction acts to draw the member upwardly so that the crank portion 49 engages the lower side of the lower track channel to clamp the carriage 30 tightly to the stationary part 14. Thus the carriage may be locked to structure 14 in any one of infinitely variable positions.

The carriage may also be locked in the center position shown in Figure 4 where the blade cuts at 90 degrees to the fence 44. For this purpose a pin 50 extends through an elongated slot 51 in the carriage and can be engaged in the aperture 51a in the stationary part 14. A reduced portion of the pin is embraced by a slot in the guide member 51b to hold the pin in the unlocked position.

It will be noted that a cutting flight of the blade passes through a slot 44a in the rear fence at a point exactly through the center of the vertical pivot of the saw head regardless of the horizontal angular position of the blade. In other words, a common reference point is established on the table which locates the point at which one edge of the cut will be located, and the workpiece W can therefore be quickly set up in position on the table. Furthermore, and importantly, the blade cuts the workpiece in a direction normal in at least one direction to the horizontal, and creeping of the blade along the workpiece before biting in is thereby prevented. A more accurately cutting saw is thereby provided and one which cuts particularly straight.

Figure 5:
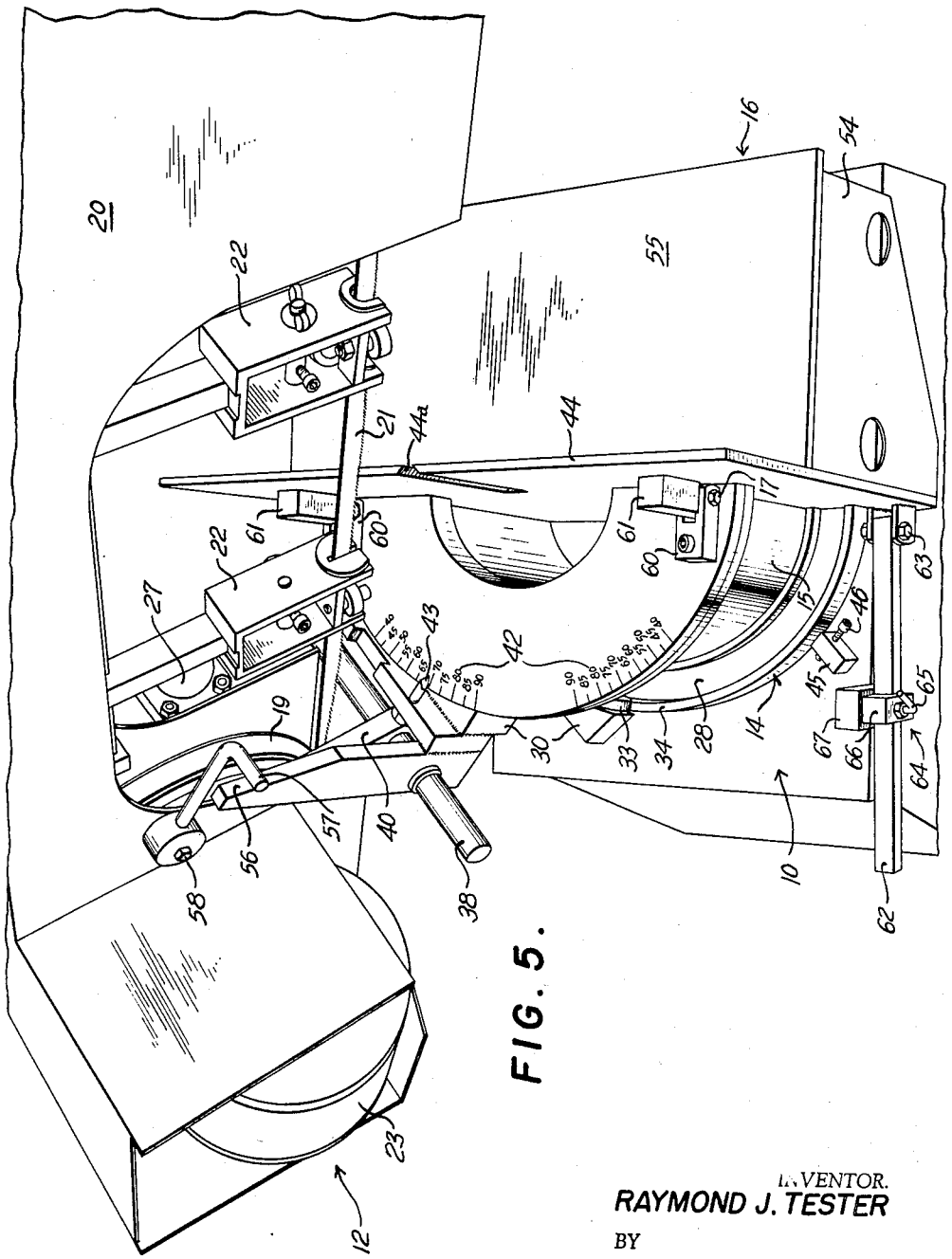
Figure 5 is a fragmentary perspective view of the saw taken generally from the upper right side thereof, and showing the head set at an angle and also raised from the cutting position.

It should also be noted that the direction of travel of the working flight of the blade is toward the fence 44 when using the saw in either the position shown in Figures 1 and 5 or in a position such as that shown in Figure 6. Furthermore, when using a table as in Figure 1, the weight of the head acts to hold the workpiece securely against the table. Thus the blade engages the work in a manner which tends to hold it securely in place while being cut.

Chatter and vibration of the saw head 12 while cutting has been substantially eliminated because the line of force in the cutting flight, that is, the center of pull of the blade on the workpiece is almost directly through the supporting pivot axis 38 of the saw head, and the blade is pulled smoothly and directly through the workpiece, regardless of the cutting angle, without undue deflection or bending of the blade. Stated otherwise, the moment arm of the line of force or pull in the cutting flight relative to the pivot shaft 38 is negligible which results in the elimination of bending stresses of the head relative to the support structure. The result is a chatter-free cutting operation, regardless of the number or size of cutting teeth in the blade, or regardless of the horizontal or vertical angular cutting position of the saw head.

Suitable pipe vises or other clamps (not shown) could be used, particularly for round cross section stock, for holding the stock firmly on the table and against the rear wall 44.

If a particularly long piece of stock is to be cut, holding rollers 52 are provided on the extensions 53 which extend through the table sides 54, and the top of these rollers lie in the same plane as does the top 55 of the table.

The carriage 30 has an upwardly extending stop portion 56 at one side which is engaged by the arm 57 carried by the head when the latter is tilted rearwardly a predetermined amount about its axis 38. When using the saw for cutting in a horizontal direction, as in Figure 1, this stop and arm serve as an upward limit for the travel of the head after the cut has been made. When it is desired to use the saw in the vertical cutting position as shown in Figure 7, the nut 58 (Figure 5) is loosened allowing the arm 57 to be rotated out of the way so that it clears the stop 56 when the head is rotated upwardly and rearwardly.

The table 16 is pivotally connected to the stationary support 14 for relative swinging between the full line position shown in Figure 3 and a tilted position, such as that shown by the broken lines in that figure. For so pivotally mounting the table, a pair of bifurcated blocks 60 are secured at spaced locations on the top of support 15 and a pair of complementary blocks 61 are also secured to the back side of the wall or fence 44. Blocks 61 extend between the bifurcated end of their corresponding block 61 and a bolt 17 extends through the blocks to form a pivot for the table.

Adjustable locking means are provided for holding the table in any desired tilted position. This means takes the form of an arm 62 pivotally mounted to each end of the table as at 63, and which slidably extend through their corresponding bracket assembly 64 secured to the base 10. A thumb screw 65 extends through the bracket part 66 and is threaded into the stationary part 67 to thereby draw the arm tightly against part 67 and hold it in any desired position.

When the table is thus tilted to the position shown by the broken lines in Figure 3, and workpiece P held thereon, a cut having a square bottom can be formed part way through the workpiece. Stated otherwise, the table would be adjusted to the position where the bottom B of the cut is at the point where the blade is normal or square to the piece P. This point is located above the horizontal pivot axis of the table. A slot, V-shaped notch or other opening can thus be cut partially through the workpiece, and the bottom of the cut made square with the piece without secondary operations, thereby greatly facilitating such operations.

As shown in Figure 6, the table part 55 and its sides 54 can be removed from the rear fence or wall 44 by removing the four wing bolt means 70 (only two are shown in Fig. 2) which threadably extend into the wall 44. The wall has a plurality of aligned tapped apertures 72 for receiving bolts 73 that adjustably secure various slotted stops 74 to the wall for holding a piece 75 in position for cutting, for example, along the line C. Thus workpieces may be quickly set up on the wall 44 and accurately aligned in relation to the slot 44a and more particularly, the cutting flight of the blade. Set-up time is held to a minimum and productiong reatly increased.

Figure 7 shows the saw as used in the vertical cutting position and with an auxiliary work supporting table 76 in place. Table 76 has a pair of downwardly extending brackets 77 with bifurcated ends which embrace the top edge of the wall 44. The table 76 is also adapted to rest on the extension 56 of the carriage and is thus easily attached to or removed from the machine. The table 76 has a slot 78 through which the blade travels downwardly, holding the workpiece against the table. When in this position, the saw head is locked in the center position relative to the support structure by means shown in Figures 8 and 9, and can be used as a horizontal table band saw.

By means of the present invention, a highly versatile saw has been provided which can function as a cut-off saw, to cut off stock, for example, at various angles. The saw blade cuts normal to the horizontal to prevent creeping of the blade along the surface of the work when commencing a cut. Additionally, a fixed and common reference cutting point is provided on the table for any angular cut and to which the workpiece is quickly orientated before each cut.

The support table and blade can both be tilted independently of one another to position a workpiece relative to the blade so that various shaped cuts having square bottoms can be formed in the piece without the necessity of secondary operations.

Furthermore, the table itself may be quickly modified to provide an adjustable mounting surface on which jigs and fixtures are readily mountable, which greatly facilitates production work.

A saw made in accordance with this invention can furthermore be used as a vertical saw without modification except to fit an auxiliary table directly on the existing one.

When using this saw in any of these positions, the working flight of the blade is drawn through the work and passes closely adjacent the horizontal pivot of the saw head. Thus the line of force of the cutting flight has a negligible moment arm in respect to the point of support of the saw head, and vibration and chatter thereof is eliminated.

Various modes of carrying out the invention are contemplates as being within the scope of the following claims particularly pointing out and distinctly claiming the subject matter which is regarded as the invention.

I claim:

1. A bandsaw machine comprising in combination, a support structure, and a cutting head including an endless blade having a cutting flight, said head being pivotally mounted about a horizontal axis relative to said structure for swinging between a horizontal and a vertical position for said cutting flight, said head also mounted relative to said structure for swinging about a vertical axis to any one of a plurality of angular cutting positions, said support structure having a common reference point through which said flight passes when in any of said angular cutting positions.

2. A bandsaw machine comprising in combination, a support structure, and a cutting head including an endless blade having a cutting flight, said head being pivotally mounted about a horizontal axis relative to said structure for swinging between a horizontal and a vertical position for said cutting flight, said support structure including a work-supporting table pivotally mounted on a horizontal axis for tilting relative to said head, said head also mounted relative to said structure about a vertical axis for swinging to any one of a plurality of angular cutting positions, said table having a common reference point located in said vertical axis and through which said flight passes when in any of said angular cutting positions.

3. A bandsaw machine comprising in combination, a support structure including an arcuate-shaped portion having a vertical axis and a work-supporting table, a carriage mounted for movement around and on said arcuate-shaped portion about said vertical axis to any one of a plurality of angular positions, and a cutting head including a bandsaw having a cutting flight pivotally mounted to said carriage about a horizontal axis for swinging between a horizontal and a vertical position for said cutting flight, said table having a common reference point through which said flight passes when said carriage is in any of said angular positions.

4. A device as defined in claim 3 further characterized in that said table is pivotally mounted to said arcuate-shaped portion about a horizontal axis for tilting relative to said head.

5. The combination set forth in claim 3 further characterized in that, said arcuate-shaped portion includes upper and lower arcuate guide tracks, and rollers mounted on said carriage for engagement with said tracks for supporting the carriage as it moves on and relative to said portion.

6. A device as defined in claim 3 including, a quick attachable auxiliary table adapted to be supported by said table and said carriage for supporting a workpiece in cutting relationship with said flight when said head is in said vertical position.

7. A bandsaw machine comprising in combination, a support structure, a work-supporting and generally vertical wall pivotally mounted to said structure about a horizontal axis, a cutting head including an endless blade having a cutting flight, said head being pivotally mounted about a horizontal axis relative to both said structure and wall for swinging from a horizontal position to a tilted cutting position, said wall tiltable about its horizontal axis and having a slot through which said flight travels, and means for securing a workpiece to said wall and across said slot whereby said flight may be normal to said wall at a point above the horizontal pivot axis of said wall when cutting said workpiece.

8. A bandsaw machine comprising, a work-supporting structure, a carriage mounted on said structure for swinging about a vertical axis to different angular positions, and a cutting head including an endless blade having a cutting flight, said head being pivotally mounted on said carriage for swinging about a horizontal axis, said work-supporting structure having a common reference point for a workpiece and through which said flight passes when in any of said angular cutting positions.

9. A device as defined in claim 8 further characterized in that said work-supporting structure includes a table which is pivotally mounted on a horizontal axis for swinging movement independently of said head.

10. The combination set out in claim 8 wherein said common reference point is contained in said vertical axis.

11. The structure as defined in claim 8 further characterized in that the line of force of said cutting flight passes closely adjacent said horizontal axis.

References Cited in the file of this patent
UNITED STATES PATENTS

| | | |
|---|---|---|
| 490,212 | O'Connor | Jan. 17, 1893 |
| 950,638 | Nolan et al. | Mar. 1, 1910 |
| 1,269,288 | Landoll | June 11, 1918 |
| 1,296,488 | Du Laney | Mar. 4, 1919 |
| 1,368,777 | Wernicke | Feb. 15, 1921 |
| 2,422,843 | Mooradian | June 24, 1947 |
| 2,551,268 | Hoffman | May 1, 1951 |
| 2,655,955 | Dziengiel | Oct. 20, 1953 |
| 2,711,195 | Hill | June 21, 1955 |